April 24, 1928.
M. HEGGE
1,667,152
WAVE MOTOR
Filed May 19, 1926
2 Sheets-Sheet 2
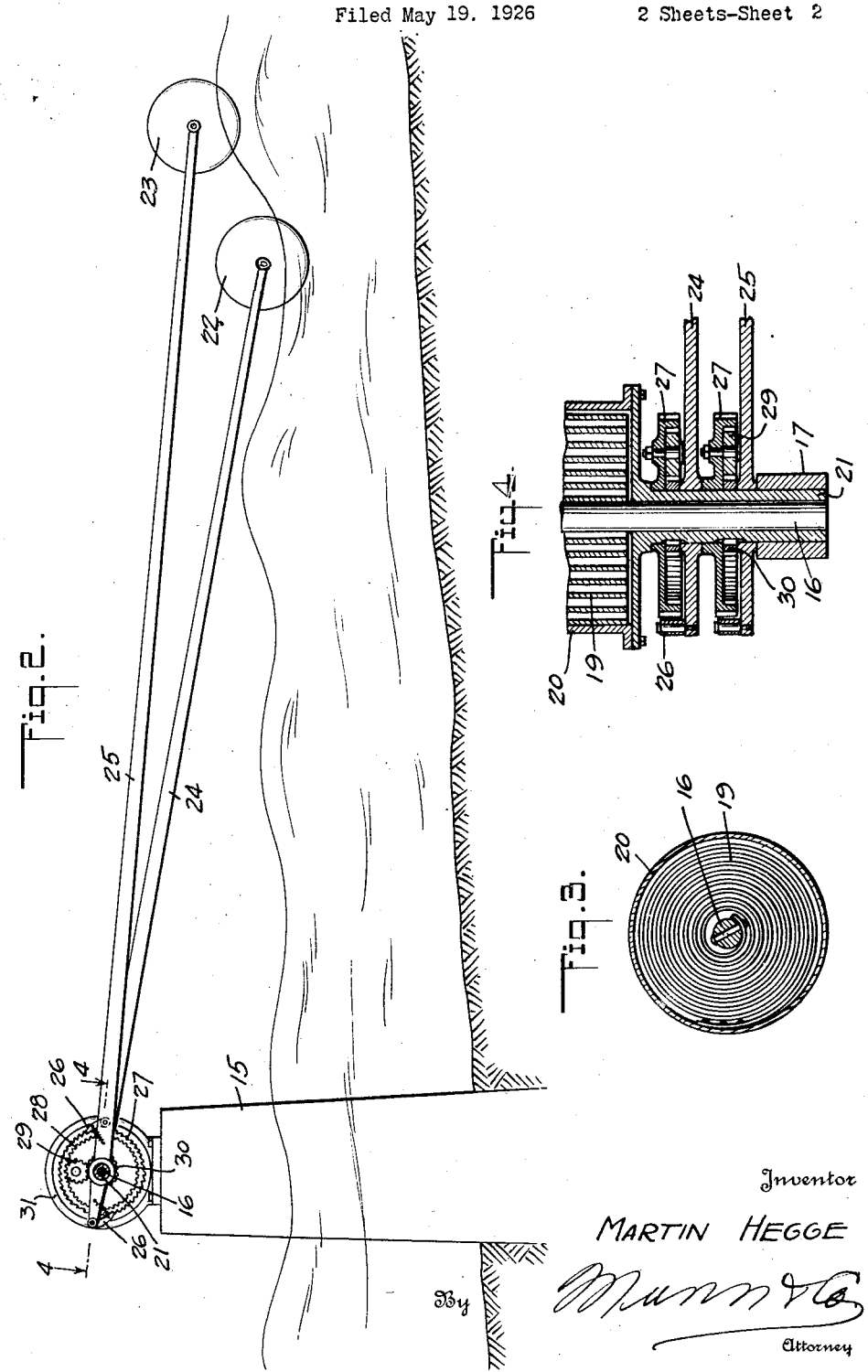
Inventor
MARTIN HEGGE Patented Apr. 24, 1928.

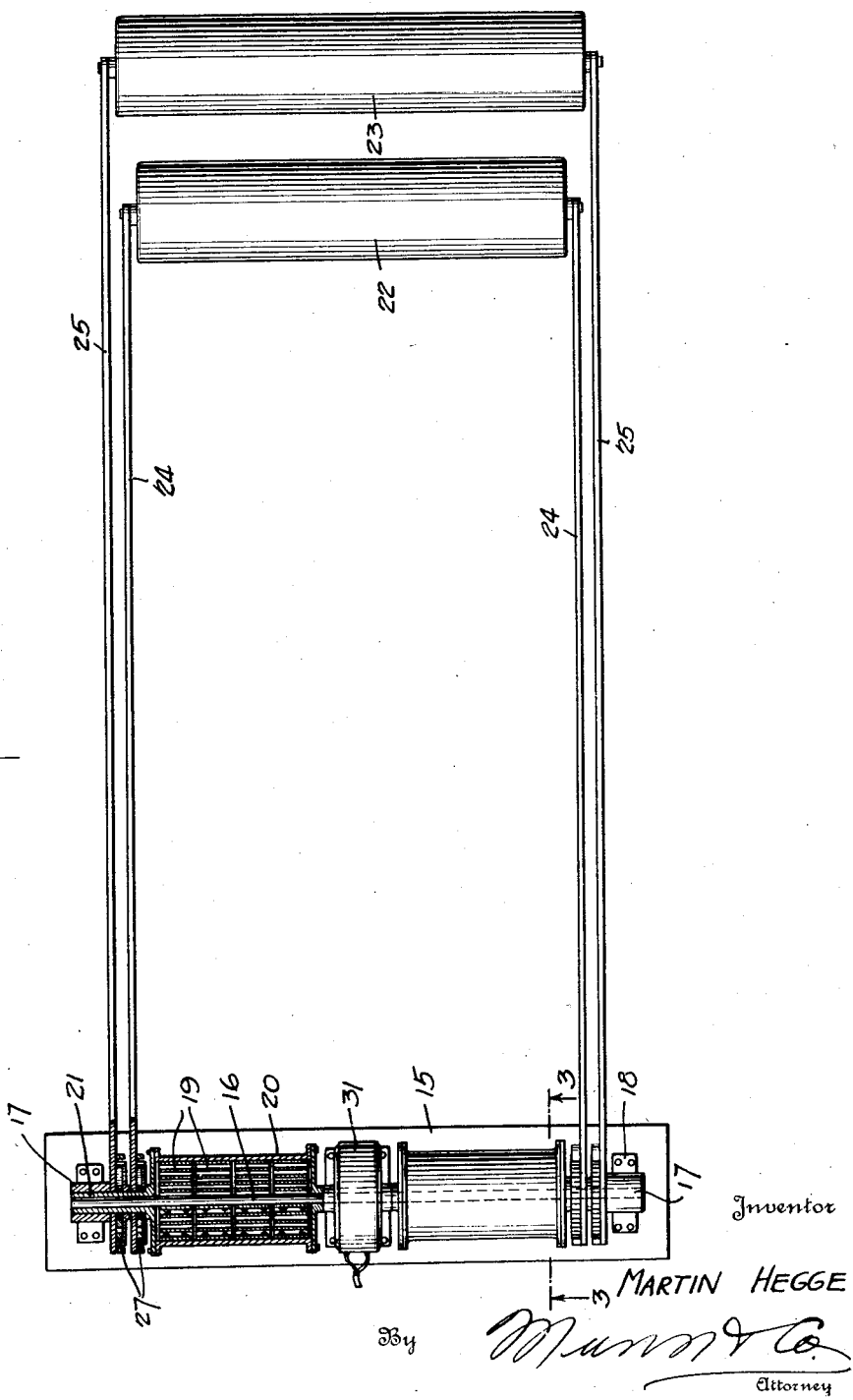

1,667,152

UNITED STATES PATENT OFFICE.

MARTIN HEGGE, OF LOS ANGELES, CALIFORNIA.

WAVE MOTOR.

Application filed May 19, 1926. Serial No. 110,227.

My invention relates to wave motors of the type in which floats are raised by waves and the gravitation of the floats is utilized to rotate a shaft from which power may be taken for various purposes.

It is a purpose of my invention to provide a wave motor of the character described which is constructed and mounted in respect to a body of water subject to waves as to fully utilize the power of the waves in converting their motions into useful work, and yet without the possibility of the waves breaking upon and thus injuring or destroying the apparatus. Further, my invention provides a mechanism which is operable by the raising and lowering of the floats to store a relatively large quantity of power which can be used or expended to produce a steady and even flow of power to operate various devices.

I will describe only one form of wave motor embodying my invention and will then point out the novel features thereof in claims.

In the accompanying drawings,

Figure 1 is a view showing in top plan and partly in section one form of wave motor embodying my invention;

Figure 2 is a view showing a wave motor in side elevation and in operative position with respect to a body of water;

Figure 3 is a sectional view taken on the line 3—3 of Figure 1;

Figure 4 is an enlarged fragmentary sectional view taken on the line 4—4 of Figure 2.

Referring specifically to the drawings, my invention, in its present embodiment, comprises a pile 15 of elongated form which is fixedly positioned in the bed of a body of water subject to waves and at such distance beyond the shore as to be disposed clear of the breakers. Mounted on the top of the pile are a plurality of spring motor units. In the present instance, I have shown only two units, but it will be understood that any number of units may be employed. The units are arranged in end-to-end relation and mounted upon a common shaft 16, the latter being journaled in bearings 17 on uprights 18 secured to the top of the pile. Each unit comprises a plurality or gang of coil springs 19 housed in a drum 20 and with their inner ends secured to the shaft 16 while their outer ends are secured to the drum. The outer end of each drum is formed with an elongated hub 21 journaled in a corresponding bearing 17 and, as shown in Figure 4, providing a mounting for a mechanism by which the drum is adapted to be rotated in such direction as to effect winding of the springs so that their power may be transmitted to the shaft 16.

Yokes are fulcrumed on the hubs 21 and floats 22 and 23 are carried by the yokes, each yoke comprising a pair of arms 24 and 25, respectively, connected at their outer ends to the floats 22 and 23, respectively. The arms 24 are of less length than the arms 25 so that the floats 22 and 23 can be arranged one in advance of the other and thereby cause the successive rocking of the arms, as will be understood.

Each arm 24 or 25 is provided with a pair of pawls 26 reversely disposed and spring pressed to engage a ratchet ring 27 freely rotatable on the hub 21 and formed interiorly with a ring gear 28 which constantly meshes with a planetary pinion 29, the latter, in turn, meshing with a pinion 30 secured to the hub 21. The pawls 26 are arranged at opposite sides of the fulcrum point of the arm so that when the latter is rocked the pawls will be actuated to effect unidirectional rotation of the ratchet ring which will be transmitted to the hub 21 through the pinions 29 and 30.

In the present embodiment of my invention, the confronting ends of the spring motor units are spaced to accommodate an electrical generator 31, the shaft of the generator being common to the shaft 16 so that rotation of the latter will actuate the armature of the generator to generate current. With the motor in applied position, as shown in Figure 1, the yokes extend shoreward from the pile 15 so as to position the floats 22 and 23 beyond the breakers and to thereby preclude the possibility of waves breaking on the floats and yokes. The floats under the action of the waves will be successively elevated and lowered, thereby rocking the arms 24 and 25 to actuate the pawls 26 and thereby effect unidirectional rotation of the drums 20 to cause winding of the springs 19. In this manner the springs serve to store power which is expended in rotating the shaft 16 to actuate the generator 31, and because of the association of the springs with respect to the shaft, it will be clear that a steady and continuous flow of power is transmitted to the shaft.

Although I have herein shown and described only one form of wave motor embodying my invention, it is to be understood that various changes and modifications may be made therein without departing from the spirit of the invention and the spirit and scope of the appended claims.

I claim as my invention:

1. In a wave motor, a spring motor unit including a shaft, a drum comprising an open ended cylinder and heads closing the ends of the cylinder and rotatably mounted on the shaft, one of the heads having an axial extension to provide an elongated hub on the shaft, a plurality of coil springs in the drum having their outer ends fixed to the cylinder and their inner ends fixed to the shaft, pinions fixed to the hub, ratchet rings rotatably mounted on the hub and formed internally with teeth to provide gears, planetary pinions meshing with said gears and pinions, arms fulcrumed on the hub and adapted to be oscillated by floats, and pawls carried by the arms and engaging the ratchet rings, whereby oscillation of the arms will operate the pawls and thereby effect unidirectional rotation of the drums to wind the springs.

2. In a wave motor, a pair of spring motor units arranged in end to end relation, each unit including a drum, a plurality of coil springs having their outer ends fixed to the drum, a shaft common to both of the drums and on which the latter are freely rotatable, the inner ends of the springs being secured to the shaft, pairs of arms fulcrumed on the shaft and adapted to be actuated by floats, pinions fixed to the drums, ratchet rings rotatable on the drums, said rings being formed internally with teeth to provide gears, planetary pinions meshing with said gears and said pinions, and pawls carried by the arms and engaging the ratchet rings, whereby actuation of the arms will operate the pawls and thereby effect unidirectional rotation of the drums to wind the springs.

MARTIN HEGGE.